(12) United States Patent
Borer et al.

(10) Patent No.: US 7,884,177 B2
(45) Date of Patent: Feb. 8, 2011

(54) METHOD AND DEVICE FOR THE CONTINUOUS POLYCONDENSATION OF POLYESTER MATERIAL IN THE SOLID PHASE

(75) Inventors: Camille Borer, Flurlingen (CH); Martin Muller, Uzwil (CH); Brent Allan Culbert, Wil (CH)

(73) Assignee: Buhler AG, Uzwil (CH)

( * ) Notice: Subject to any disclaimer, the term of this patent is extended or adjusted under 35 U.S.C. 154(b) by 774 days.

(21) Appl. No.: 10/470,988

(22) PCT Filed: Feb. 26, 2001

(86) PCT No.: PCT/CH01/00124

§ 371 (c)(1),
(2), (4) Date: Mar. 1, 2004

(87) PCT Pub. No.: WO02/068498

PCT Pub. Date: Sep. 6, 2002

(65) Prior Publication Data

US 2004/0192878 A1    Sep. 30, 2004

(51) Int. Cl.
*C08G 63/80* (2006.01)
*C08G 63/88* (2006.01)
*C08F 6/26* (2006.01)

(52) U.S. Cl. ............... 528/483; 528/491; 528/492; 528/501; 528/503

(58) Field of Classification Search ............ 528/483, 528/491, 492, 501, 503; 425/6, 110
See application file for complete search history.

(56) References Cited

U.S. PATENT DOCUMENTS

| | | | |
|---|---|---|---|
| 4,271,287 A | 6/1981 | Shah | 528/272 |
| 4,584,366 A | 4/1986 | Gerking | 528/502 |
| 5,510,454 A | 4/1996 | Stouffer | 528/308.1 |
| 5,714,571 A * | 2/1998 | Al Ghatta et al. | 528/308.2 |
| 5,817,747 A * | 10/1998 | Giordano et al. | 528/503 |

* cited by examiner

*Primary Examiner*—Irina S Zemel
(74) *Attorney, Agent, or Firm*—Francis C. Hand; Carella, Byrne, Cecchi

(57) ABSTRACT

The invention relates to a method and device for the continuous polycondensation of polyester material in the solid phase, in particular in the form of partially crystalline granulate. The aim of the invention is to achieve a high product throughput on recrystallising and recondensation of polyester material with a low initial IV. Said aim is achieved, whereby on recrystallisation, a low residence time of 1-10 minutes is achieved, by means of a rapid heating of a thin product layer, followed by an SSP treatment.

11 Claims, 4 Drawing Sheets

Figure 1:
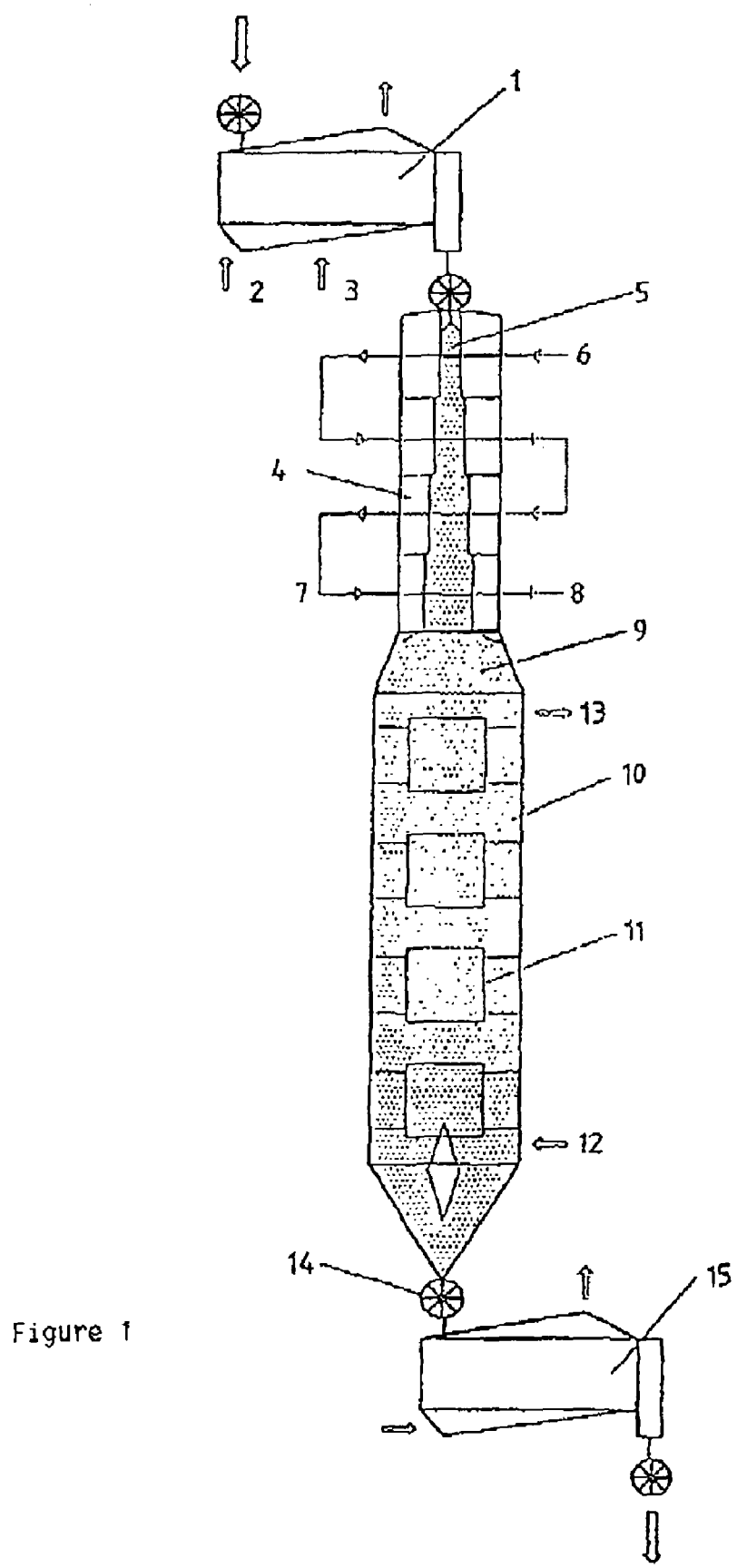

METHOD AND DEVICE FOR THE CONTINUOUS POLYCONDENSATION OF POLYESTER MATERIAL IN THE SOLID PHASE

The invention relates to a procedure for the continuous polycondensation of polyester material in a solid phase. More particularly, this invention relates to a procedure for the continuous polycondensation of PET in the form of granulate or the like. Still more particularly, this invention relates to an apparatus for the continuous polycondensation of polyester material in a solid phase.

Depending on the intended use of polyester materials, special properties are necessary. If certain properties can already be modified in a targeted manner with the recipe of components, co-components or additives, other properties, e.g., a high molecular weight and high purity, can only be achieved via subsequent treatment in the solid phase (SSP). Since polyester production and subsequent treatment are most often separated in terms of time and location, granulate is fabricated as an intermediate product. These are precipitated in amorphous form due to a low crystallization rate and rapid cooling of the polyester melt. During granulation and storage, granulate absorbs liquid, which can lead to hydrolysis during subsequent re-melting. In addition, amorphous polyester granulate has a strong tendency to bond at higher temperatures (in particular above 100° C.).

Various procedures and devices are known for the conventional crystallization and post-condensation of polyester materials in a solid phase, e.g., according to EP-A-379684 or DE-AS-2559290 or U.S. Pat. No. 4,238,593. To prevent bonding, the granulate is intensively moved during crystallization and polycondensation according to U.S. Pat. No. 4,064,122.

Solutions are also known here for keeping the ratio between inflowing process gas to outgoing product during post-condensation to less than 0.6 (EP-A-717061), in order to better control the thermal profile and effectively remove contaminants. The gas can flow in the same or opposite direction as the product stream.

To prevent the granulate for subsequent treatment from being heated again, it has already been suggested that polyester material be extruded, pelleted and crystallized without cooling the melt (EP-A-822214). In this case, a temperature of 160° C. to 220° C. is maintained, and only a slight temperature rise to approx. 170° C. to 230° C. is necessary for the ensuing SSP process. A similar solution is disclosed in WO-A-97/23543 and U.S. Pat. No. 5,510,454, where melt drops get onto a hot metal plate and partially crystallize. Due to specific crystal structures, the achievable IV values are to be less than 0.3. Low IV values of 0.4 to 0.6 can also be gleaned from U.S. Pat. No. 4,154,920.

It is also known to provide a band (ROLLDROP) instead of a metal plate, or to have the material pass as a strand through a drying segment with a casting gutter, through which air streams, wherein granulation takes place after drying (WO-A-94/25239).

The object of the invention is to develop a procedure for the continuous polycondensation of polyester material in a solid phase which enables a high throughput of polyester material.

The object of the invention is also to provide a device for executing such a procedure.

The invention proceeds from the assumption that large quantities of polyester material can be subjected to an SSP treatment without damaging the crystal structures if rapid heating takes place. This rapid heating for recrystallization can take place both with cold and hot granulate. It is necessary to maintain small granule layer heights to achieve a rapid heating given a high throughput (passing through hot process gas) within a few minutes. This rapid heating must simultaneously be controlled (heating rate) to prevent the polyester material from melting on or open.

The temperature must then be maintained and set in order to avoid a bonding during SSP treatment despite the usual retention times (up to approx. 40 hours) in the reactor.

Only a low energy and gas outlay is required relative to the high product quantity.

The invention provides a procedure for the continuous polycondensation of polyester material in a solid phase in the form of amorphous or partially crystallized granulate via post-crystallization at 140° C. to 250° C. and subsequent post-condensation at approximately 200° C. to 250° C. and final cooling to under 60° C. wherein conventional process gases are used as the heating and cooling medium, characterized in that the heating-up time to the post-crystallization temperature and retention time measures 1-10 minutes.

The invention will be described in greater detail below in an example based on a drawing. Shown on the drawing are FIG. 1: a first form of execution in a basic diagram
FIG. 2: a second form of execution in a basic diagram
FIG. 3: a third form of execution in a basic diagram
FIG. 4: another form of execution in a basic diagram.

Figure 2:
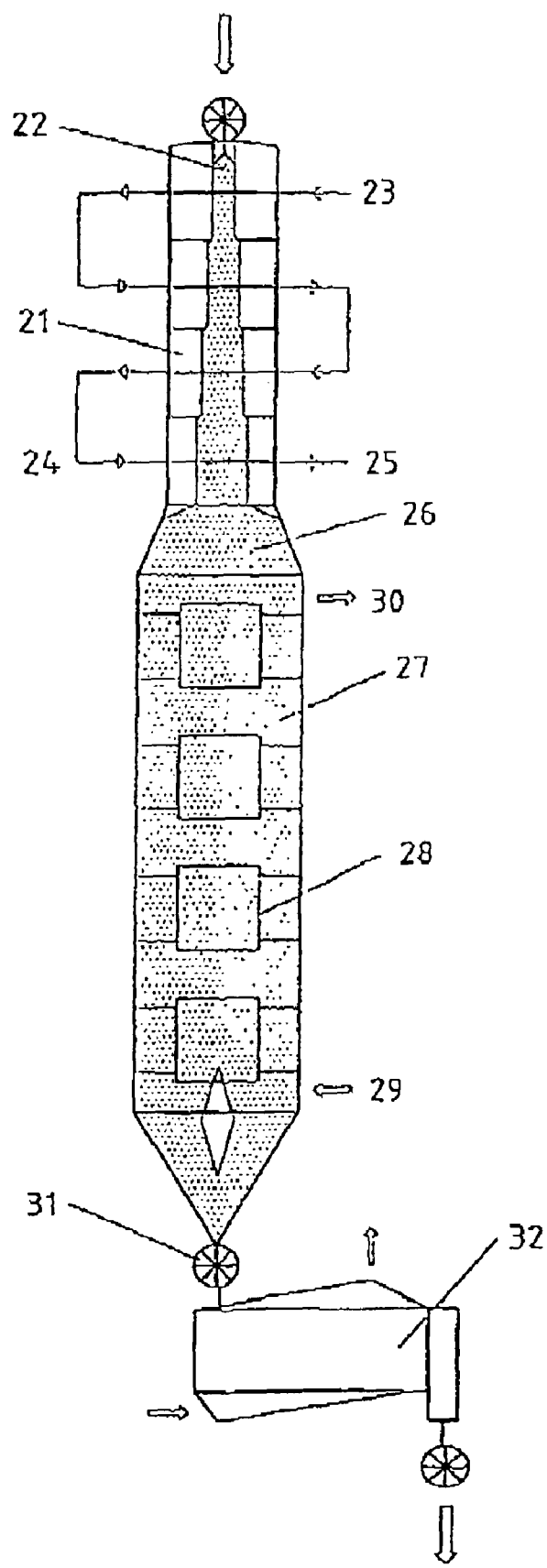

According to FIG. 1, an amorphous or partially crystallized (approx. 0-50%) polyester granulate with a IV of up to 0.7 and a low temperature (room temperature or higher) or in a hot state (up to approx. 200° C.) gets into a fluidized bed 1 (type OTWG of the applicant). A hot process gas 2, e.g., air or nitrogen, is here passed through the granulate. The supplied high quantity of gas has a rate of 1.5-4 m/s. In 2-8 minutes, the granulate is heated to 200° C. to 250° C., so that the layer height measures only 1-30 cm, preferably 2-15 cm. In known procedures, the heating and retention time measures 2-25 minutes, preferably 15 minutes (EP-A-379684) or 5-30 minutes (EP-A-822214). Instead of a single gas inlet 2, two gas inlets 2 and 3 with varying gas inlet temperatures can be used.

The post-crystallizer 4, in which the granulate gets into a channel 5 from above, has a structure corresponding to that disclosed in DE-A-19743461 of the applicant. The channel can enlarge from a width of approx. 5-10 cm (top) to approx. 20-30 cm in the middle area, and to approx. 40-60 cm in the bottom area of the post-crystallizer 4. However, the channel 5 can also have a constant width of 10 cm to 60 cm, for example. Large quantities of gas are passed through the granulate in a cross flow, wherein gas flows in 6 and out 8. The gas can also enter at position 7, and correspondingly exit at position 6. As an alternative, the gas can also pass through the product in a parallel or counter flow. The disclosed configuration of the post-crystallizer 4 yields a uniform granulate throughput given short heating and retention times with ensuing heating (approx. 0.2 to 3 hours, preferably 0.5 to 1 hour) at temperatures of between 200 and 250° C.

The granulate passes directly into the reactor 10 through a channel 9, where it stays for up to approx. 40 hours at a constant temperature for purposes of SSP treatment. To make throughput more uniform and prevent bonding, the reactor 10 has internal parts 11 of the kind known from CH-A-689284 of the applicant. Correspondingly low quantities of gas can be used in a countercurrent. Inert gas, e.g., nitrogen, is used as the process gas. The product is pre-cooled where the gas flows in 12 with a gas entry temperature of less than or equal to 60° C. The reactor gas exits at position 13, but can alternatively exit at position 8 too.

When rapidly heating the product close to the melting point, which happens in the proposed mode of operation (in the fluidized bed 1 and post-crystallizer 4), crystallinity is limited, and it has been shown that this causes the SSP reactivity to rise sharply (the IV buildup/h is significantly higher than for conventional heating). See Table 1.

The SSP treated granulate exits the reactor 10 through a transfer canal 14 to be further cooled to under 60° C. product temperature in a fluidized bed cooler 15.

A conventional roof dryer can also be used as the post-crystallizer. A two-stage crystallizer could also be used.

In a second configuration according to FIG. 2, the again cold or hot granulate gets into a channel 22 of a system that incorporates a post-crystallizer 21 and reactor 27. The post-crystallizer 21 has a similar design as that of the first configuration on FIG. 1 (post-crystallizer 4). Heating to 200° C. to 250° C. is rapid, and takes place in the uppermost sections of the post-crystallizer 21. The gas rapidly passes through gas inlet 23 to the granulate in channel 22. The retention time in the post-crystallizer 21 measures between 0.5 and 8 hours. The product can again be easily cooled via the gas inlet 24 in the lowermost section of the post-crystallizer 21. The gas exits at position 25.

The granulate passes via a channel 26 directly into the reactor 27, where it remains for up to approx. 36 hours at a constant temperature for purposes of SSP treatment. The description of the reactor 27 and the process explanations relating to form of execution 1 also apply to reactor 27. A gas inlet 29 is provided near the floor of the reactor 27, but above a cone. Another gas inlet 30 is located below the channel 26. See Table 1 for the individual data.

The SSP-treated granulate exits the reactor 27 through a transfer canal 31, and is further cooled to below a product temperature of 60° C. in a fluidized bed cooler 32.

Figure 3:
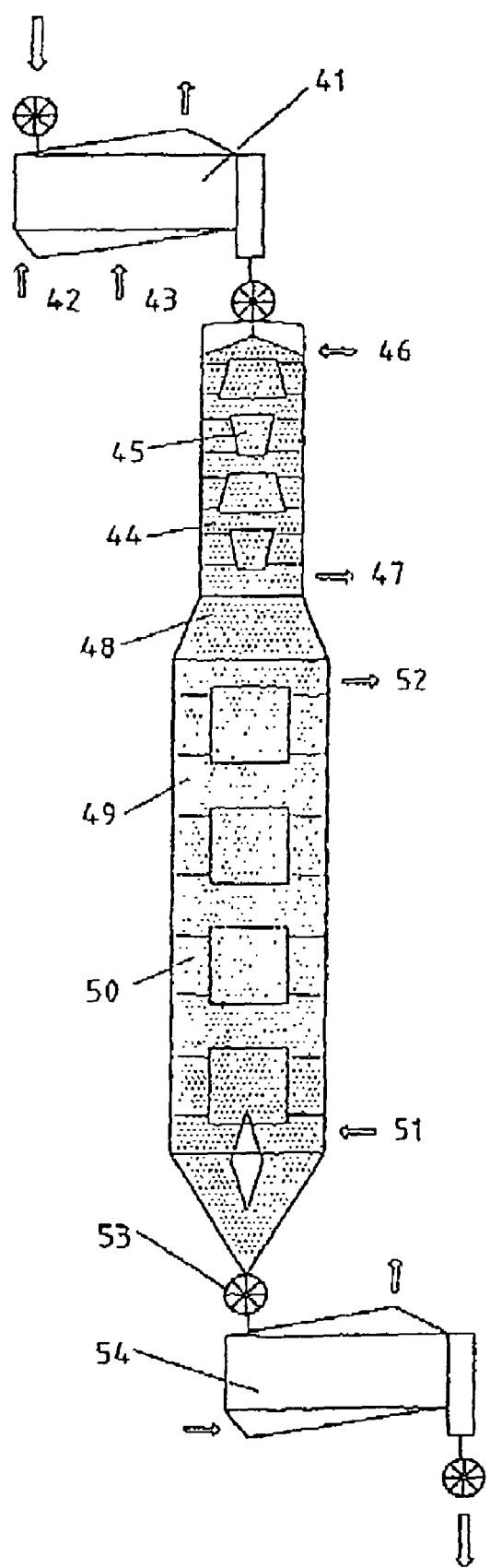

A third form of execution is described according to FIG. 3. In this case, an amorphous or partially crystallized (approx. 0-50%) polyester granulate with a IV of up to 0.7 and a low temperature (room temperature or higher) or in a hot state (up to approx. 200° C.) in a fluidized bed 41 (type OTWG of the applicant). A process gas 42, e.g., air or nitrogen, is there passed through the granulate, supplied via the gas inlet 42 and/or 43. The supplied high quantity of gas has a velocity of 1.5-4 m/s. Within 2-8 minutes, the granulate is heated to 200° C. to 250° C., which is why the layer height only measures 1-30 cm, preferably 2-15 cm.

The granulate then gets into a conditioner 44, which is provided with annular internal parts 45 made out of sheet. The internal parts 45 are arranged in such a way as to achieve a certain directional reversal and, at a low product pressure, a high granulate settling rate. The settling rate in the upper area of the conditioner 44 is higher than in the ensuing reactor 49, but at least about the same. The internal parts 45 can also be straight (vertical).

The conditioner 44 is used to further heat the granulate to approx. 220° C.-250° C., set and maintain the temperature, and cool as necessary in the event of overheating.

The granulate is heated in a parallel or counter flow by means of process gas (gas inlet 46 and gas outlet 47 can be switched if necessary), and kept for 1-8 hours in the conditioner 44. The IV value is elevated in the process.

The granulate then gets directly to the reactor 49 located under the conditioner 44 via the transfer section 48, wherein it stays at a constant temperature for up to 36 hours for purposes of SSP treatment. To even out throughput and prevent bonding, the reactor 49 has internal parts 50, as are also known from CH-A-689284 of the applicant. The process can be executed in the counter-flow mode with correspondingly low quantities of gas. Inert gas, e.g., nitrogen, is used as the process gas. The product is pre-cooled in the area of the gas inlet 51 at a gas inlet temperature of less than 60° C. A gas outlet 52 is to be provided as in FIG. 2.

When rapidly heating the product near the melting point, which happens during operations such as those proposed (in the fluidized bed 41 and conditioner 44), crystallinity development is limited, and it has been shown that the SSP reactivity increases sharply as a result (the IV buildup/h is significantly higher than during conventional heating). See also Table 1.

The SSP treated granulate exits the reactor 49 through a transfer canal 53 to be cooled further in a fluidized bed cooler 54 to below 60° C.

Figure 4:
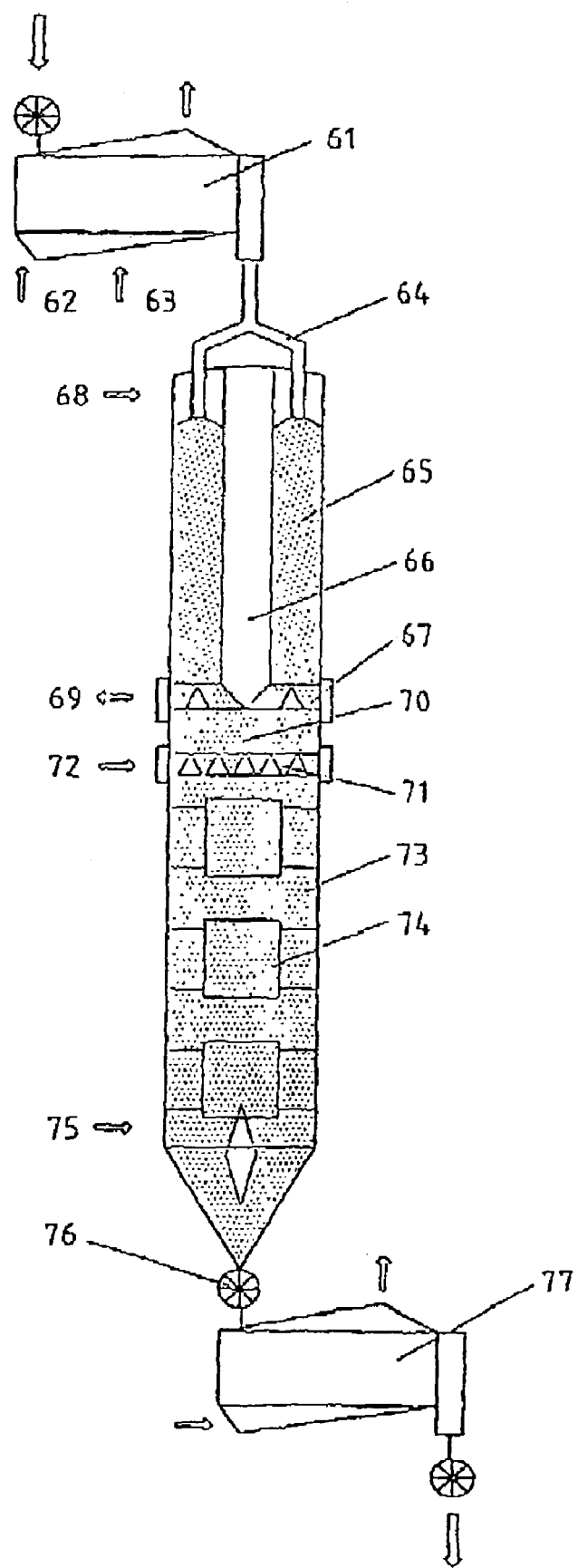

In another form of execution according to FIG. 4, an amorphous or partially crystallized (approx. 0-50%) polyester granulate with an IV of up to 0.7 and a low temperature (room temperature or higher) or in a hot state (up to 200° C.) gets into a fluidized bed 61 (type OTWG of the applicant). A hot process gas 62, e.g., air or nitrogen, is there passed through the granulate. The supplied high quantity of gas has a rate of 1.5-4 m/s. Within 2-8 minutes, the granulate is heated to 200° C. to 250° C., so that the layer height only measures 1-30 cm, preferably 2-15 cm. Two gas inlets 62 and 63 with varying gas inlet temperatures can also be used in place of the gas inlet 62.

The granulate subsequently gets into a conditioner 65 via a distributor 64. The distributor distributes the product through 6 to 16 pipes over the entire ring surface of the conditioner 65. The conditioner 65 itself is designed as a hollow cylinder. The product moves from the top down in the outer ring. The inner ring 66 is free of product and gas. The outside diameter minus the inside diameter of the hollow cylinder measures a constant 80 to 200 cm, preferably 120-160 cm (product distance between the outer wall and inner wall therefore measures 40 to 100 cm, preferably 60-80 cm). This results in a low product pressure and high granulate settling rate in the conditioner 65. The geometry of the conditioner 65 can also be similar to the post crystallizer 4 according to the first form of execution, i.e., in that the section of the conditioner filled with product increases in diameter from the top down, i.e., the product distance between the outer wall and inner wall incrementally or continuously increases from the top down, e.g., from 40 cm at the top to 100 cm at the bottom in the direction of product flow. As a result, the uppermost area of the conditioner has the lowest product pressure and highest settling rate, which then varies as the granulate treating time increases. Also provided is a gas inlet 68.

The conditioner 65 is used to further heat the granulate to approx. 200-250° C., preferably 220-235° C., set and maintain the temperature, or, if needed, cool during overheating. In the parallel flow (gas inlet 68 and gas outlet 69) or counter flow (gas inlet 69 and gas outlet 68), the granulate is heated with a process gas and kept in the conditioner 65 for 1-8 hours. The IV value is increased in the process.

The product exits the conditioner 65 and enters a transfer section 70. The temperature is here set for the ensuing reactor 73. This is done using a gas supply system 72 with inert gas (counter flow heat exchange), wherein the temperature can measure between 200° C. and 250° C., depending on the product. As an alternative, the transfer section 70 can be omitted.

The granulate exits the transfer section 70 and enters the reactor 73, where it remains for up to 40 hours at a constant temperature for SSP treatment. To make throughput more uniform and prevent bonding, the reactor 73 has internal parts 74 of the kind known from CH-A-689284 of the applicant. Correspondingly low gas quantities can be used in the counter flow mode. Inert gas, e.g., nitrogen, is used as the process gas.

The product is pre-cooled in the area of the gas inlet 75 at a gas inlet temperature of less than or equal to 60° C. The reactor gas exits at position 69.

While rapidly heating the product near the melting point, which happens in the proposed mode of operation (in the fluidized bed 61 and conditioner 65), crystallinity formation is limited, and it has been shown that this causes the SSP reactivity to increase sharply (the IV buildup/h is significantly higher than during conventional heating). See Table 1.

The SSP-treated granulate exits the reactor 10 through a transfer canal 76, and is further cooled in a fluidized bed cooler 177 to below a 60° C. product temperature.

It would additionally be conceivable to provide a central gas outlet 69 from the reactor 73 and/or conditioner 65. It would be a reversal of conventional, dome-shaped gas distributors 67, 71. To ensure the corresponding pressure conditions, the gas is then discharged via a central tube and four gas outlet tubes offset by 90°. One or two such gas outlets can be provided given a unidirectional throughput to conduct the large quantities of gas efficiently.

In all forms of execution, the product can be passed through in a combined counter and parallel flow in order to achieve a low pressure, preferably under 1 bar.

So that the process can again be used after leaving the reactor, post-crystallizer and/or pre-heater, it preferably passes through a gas cleaning system, a filter, a gas washer/scrubber or a catalyst and a molecular dryer.

TABLE 1a

The influence of heating rate up to 200° C.

| Temperature range [° C.] | Heating rate [° C./min] | Total time [min] | Fusion heat [J/g] | Crystallinity (basis 100% = 115 J/g) [%] |
|---|---|---|---|---|
| 25-200 | 100 | 1.75 | 57.6 | 50.0 |
| 25-200 | 50 | 3.5 | 57.7 | 50.2 |
| 25-200 | 10 | 17.5 | 57.4 | 49.9 |
| 25-200 | 5 | 35 | 57.4 | 49.9 |

TABLE 1b

The influence of heating rate up to 230° C.

| Temperature range [° C.] | Heating rate [° C./min] | Total time [min] | Fusion heat [J/g] | Crystallinity (basis 100% = 115 J/g) [%] |
|---|---|---|---|---|
| 25-230 | 100 | 2.05 | 51.1 | 44.4 |
| 25-230 | 50 | 4.1 | 52.6 | 45.7 |
| 25-230 | 20 | 10.25 | 55.8 | 48.5 |
| 25-230 | 5 | 41 | 57.0 | 49.6 |

TABLE 1c

The influence of temperature

| Temperature range [° C.] | Heating rate [° C./min] | Total time [min] | Fusion heat [J/g] | Crystallinity (basis 100% = 115 J/g) [%] |
|---|---|---|---|---|
| 25-200 | 50 | 3.5 | 57.6 | 50.0 |
| 25-225 | 50 | 4.0 | 52.7 | 45.8 |
| 25-230 | 50 | 4.1 | 52.6 | 45.7 |
| 25-235 | 50 | 4.2 | 53.6 | 46.6 |

TABLE 1d

The influence of retention time

| Temperature range [° C.] | Heating rate [° C./min] | Total time [min] | Fusion heat [J/g] | Crystallinity (basis 100% = 115 J/g) [%] |
|---|---|---|---|---|
| 25-225 | 50 | 3 | 68.2 | 59.3 |
| 25-230 | 50 | 3 | 67.7 | 58.7 |
| 25-235 | 50 | 3 | 66.9 | 58.2 |

LIST OF REFERENCE NUMBERS

1 Fluidized bed
2 Gas inlet
3 Gas inlet
4 Post crystallizer
5 Canal
6 Gas inlet
7 Gas inlet
8 Gas outlet
9 Canal
10 Reactor
11 Internal parts
12 Gas inlet
13 Gas outlet
14 Transfer canal
15 Fluidized bed cooler
21 Post crystallizer
22 Canal
23 Gas inlet
24 Gas inlet
25 Gas outlet
26 Canal
27 Reactor
28 Internal parts
29 Gas inlet
30 Gas outlet
31 Transfer canal
32 Fluidized bed cooler
41 Fluidized bed
42 Gas inlet
43 Gas inlet
44 Conditioner
45 Internal parts
46 Gas outlet
47 Gas outlet
48 Transfer section
49 Reactor
50 Internal parts
51 Gas inlet
52 Gas outlet
53 Transfer canal
54 Fluidized bed cooler
61 Fluidized bed
62 Gas inlet
63 Gas inlet
64 Distributor
65 Conditioner
66 Inner ring
67 Gas distributor
68 Gas inlet
69 Gas outlet
70 Transfer section
71 Gas distributor 72 Gas supply
73 Reactor
74 Internal parts
75 Gas inlet
76 Transfer canal
77 Fluidized bed cooler

The invention claimed is:

1. A process for the continuous polycondensation of polyester material in a solid phase comprising the steps of
passing a flow of hot gas through a fluidized bed of polyester granulate to heat the polyester granulate at a rate of from 50° C./minute to 100° C./minute to a temperature in a range of from 200° C. to 235° C.;
passing the heated polyester granulate from the fluidized bed through a post-crystallizer in heat exchange relation with a flow of heated gas to maintain the temperature of the polyester granulate in a range of from 200° C. to 250° C.; and
thereafter passing the polyester granulate from the post-crystallizer into a cooler in heat exchange relation with a flow of cooling gas to reduce the temperature to under 60° C. after solid state polymerisation.

2. A process as set forth in claim 1 wherein the flow of hot gas is passed through the fluidized bed to heat the polyester granulate at a rate of 50° C./minute.

3. A process as set forth in claim 1 wherein the flow of hot gas is passed through the fluidized bed to heat the polyester granulate at a rate of 100° C./minute.

4. A process as set forth in claim 1 wherein the fluidized bed of polyester granulate has a thickness of from 2 to 15 centimeters.

5. A procedure for the continuous polycondensation of polyester material in a solid phase, said procedure comprising the steps of
forming a layer of one of an amorphous or partially crystallized polyester granulate with a thickness of from 2 to 15 cm;
passing a hot process gas through said layer to heat the polyester granulate during a retention time of from 1 to 10 minutes at a heating rate of from 50° C./minute to 100° C./minute to a temperature of from 200° C. to 235° C.;
thereafter subjecting the heated polyester granulate to post-crystallizing at a temperature between 200° C. and 250° C.;
subsequently subjecting the post-crystallized polyester granulate to post-condensation at a temperature of between 200° C. and 250° C.; and
cooling the post-condensed polyester granulate to a temperature of under 60° C.

6. The procedure according to claim 5 further characterized in that said layer measures 3-8 cm.

7. The procedure according to claim 5 further characterized in that said retention time is from 2 to 8 minutes.

8. The procedure according to claim 7 further characterized in that said process gas is a high quantity of gas with a flow rate of 1.5 to 4 m/s.

9. The procedure according to claim 8 further characterized in that said process gas traverses the polyester granulate in one of a cross current, counter current and parallel current.

10. The procedure according to claim 9 further characterized in that the post-condensed polyester granulate is passed in heat exchange relation with the process gas prior to the process gas passing through said layer to cool the polyester granulate while heating the process gas.

11. The procedure according to claim 5 characterized in that nitrogen is used as the process gas.

* * * * *